Sept. 24, 1957  J. DELMONTE  2,807,695
POTENTIOMETER
Filed May 11, 1953  3 Sheets-Sheet 1

INVENTOR.
JULIAN DELMONTE
BY
ATTORNEY

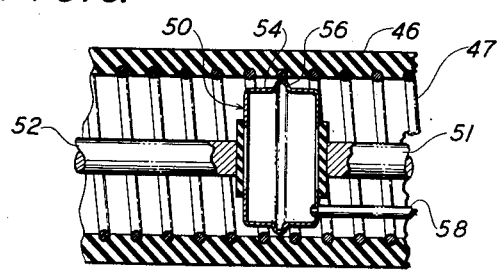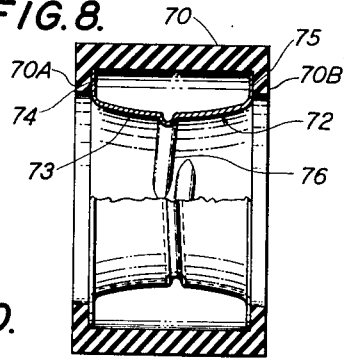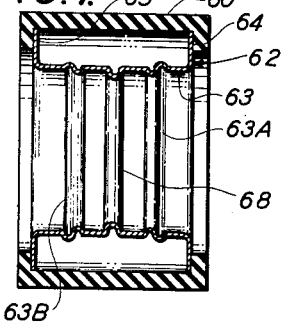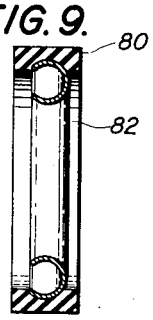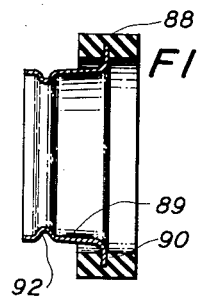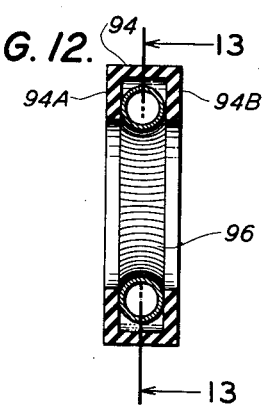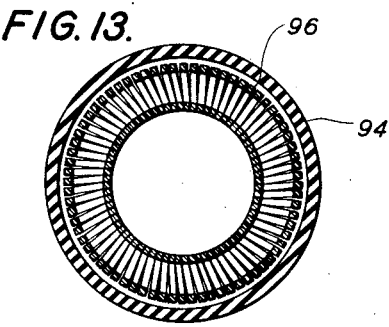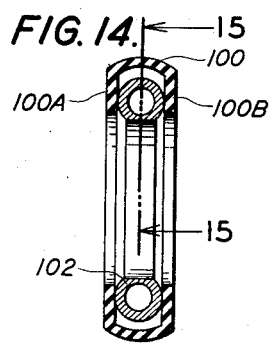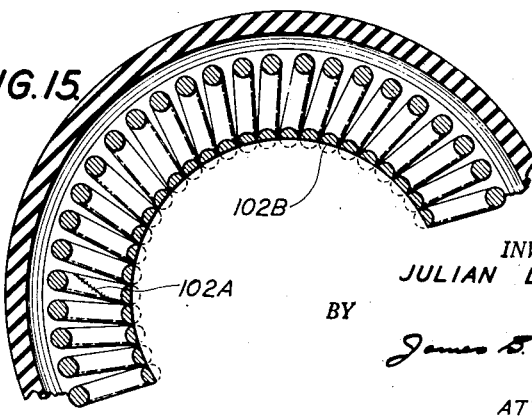

Sept. 24, 1957 J. DELMONTE 2,807,695
POTENTIOMETER
Filed May 11, 1953 3 Sheets-Sheet 3
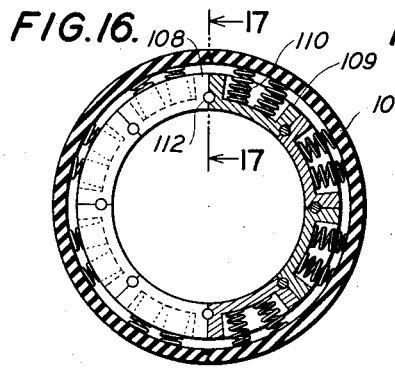
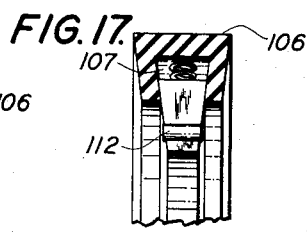
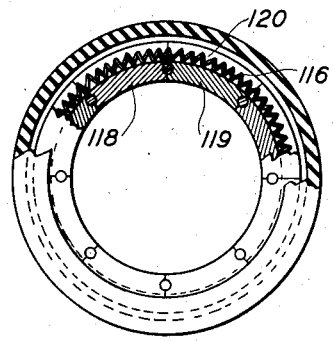
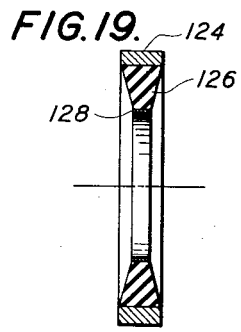
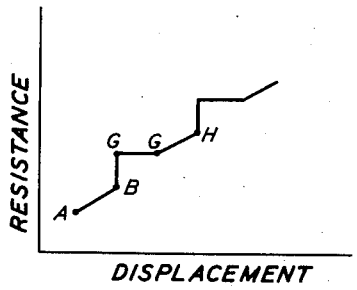
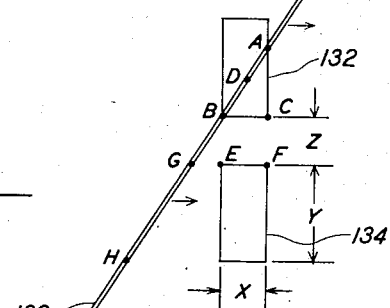
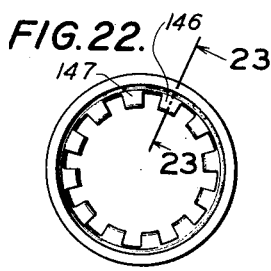
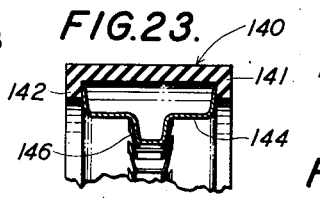
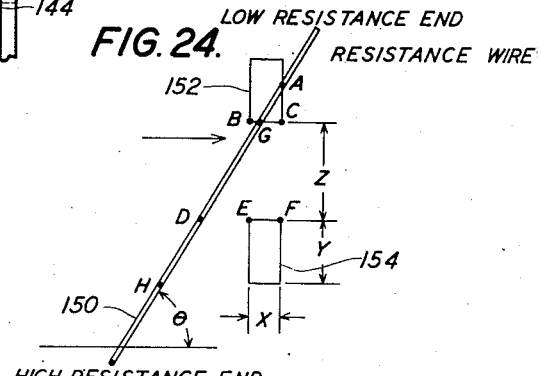
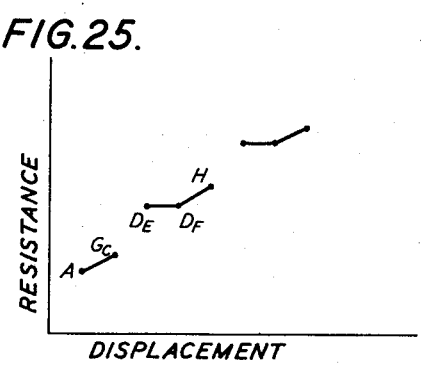
INVENTOR.
JULIAN DELMONTE
BY
James B. Christie
ATTORNEY United States Patent Office 2,807,695
Patented Sept. 24, 1957

2,807,695
POTENTIOMETER
Julian Delmonte, La Canada, Calif.
Application May 11, 1953, Serial No. 354,299
3 Claims. (Cl. 201—62)

This invention relates to potentiometers and particularly to the provision of a wire-wound potentiometer capable of displaying infinite resolution. The potentiometer is possessed of the advantageous features of both the continuous slidewire-type instruments and the multiturn-type instruments. Many of these features have heretofore been mutually unobtainable in a given instrument.

The conventional multiturn potentiometer includes a wire coil across which a voltage source is connected and a contactor or brush which, by relative motion with respect to the coil, will vary the output of the potentiometer as a function of the position of the contactor on the coil. In this case the contactor moves along the surface of the coil and generally parallel to the axis thereof. Thus as it travels, sweeping the coil turn by turn, it generates a continuous output characterized by incremental steps therein. Continuity exists by virtue of contactor construction such that it is normally in physical contact with more than one turn. Thus the resolution of the output is limited to the incremental resistance value of each turn of the resistance coil.

A multiturn potentiometer is subject to the development of a certain amount of "noise" as a function of some critical sweeping speed of the brush or contactor reflecting winding pitch, uniformity of winding, brush spring rate, brush force, and external vibration conditions. Effectively the brush, in sweeping from turn to turn momentarily leaves the winding, thereby creating an open circuit and consequent "high velocity noise."

Both of these objectionable features of multiturn potentiometers are eliminated in a continuous slidewire potentiometer wherein a contact or brush is swept along a single linearly arranged wire strand. Resolution is infinite in this instance and noise is virtually eliminated. However, a continuous slidewire potentiometer is limited in its versatilty because of the size necessary to achieve a given resistance rating.

The potentiometer of the present invention involves a novel method of sweeping a multiturn resistance wire providing an electrical control ranging from infinite resolution to discontinuous output which may be either linear or functional in character. As a consequence the advantages of a multiturn potentiometer with respect to size, low torque and versatility of resistance rating are retained, while at the same time achieving the advantages of the continuous slidewire-type with respect to resolution characteristics and precision.

The invention contemplates a potentiometer comprising a helically wound resistance coil having connector terminals by means of which the coil may be connected across a power source, a contactor providing a plurality of contact points arranged in circular configuration, means for mounting the coil and contactor with the contactor concentric to the axis of the proximate coil turn, and means for producing relative movement between the coil and contactor such that the contactor remains in concentricity with proximate coil turns.

Potentiometer coils are generally wound so that each turn is circular, the coil itself being either straight, arcuate or circular depending on the type of potentiometer in which it is to be employed. The contactor of the present potentiometer is defined as circular, the object being to conform to the configuration of each turn. However the term "circular" is used herein with reference to the contactor to include any continuous form necessary to accommodate the contactor to the associated coil, such form in most cases as indicated above being a true circle but also including non-circular coil configuration.

In the potentiometer of the invention the coil may be straight as in conventional linear motion instruments, arcuate or circular as in conventional rotary motion potentiometers. In an instrument having an arcuate or circular coil, relative movement between the coil and contactor is such as to insure concentricity of the contactor and the coil in the region of engagement. The contactor may be mounted exteriorly or interiorly of the coil, in either case, to conform to and engage the coil circumference.

In a preferred embodiment the contactor is constructed so as to present an infinite number of contact points which, in effect, produces a circumferential line or surface contact with the coil. Upon relative displacement of such a contactor and coil, the contactor effectively sweeps the resistance wire along tangential contact points. The result achieved in the embodiment of the invention providing infinite resolution may be pictured as a single contact member traveling in a spiral path around the coil, the contactor in such instance "seeing" the coil as a continuous linear or functional slidewire.

An important feature of the invention is the provision of a radially elastic circular coil-contacting-surface. To insure suitable engagement of the contacting area with the coil it is preferable that the contactor exhibit radial elasticity whereby it automatically conforms itself to the contours of the coil, thus insuring noiseless and stepless output. Several deformable and resilient contactors are illustrated and described, the invention, however, being in no way limited to such illustrated means.

Unit compliance of the contactor in the radial direction may result in deformation out of round. This deformation should be elastic in nature, the overall extent of which depends largely on the winding pitch of the wire. On the other hand, if the coil is embedded in a non-conductive mandrel to the point that only the outer surface of the coil turns is exposed, and the contactor is mounted over the mandrel in complete compliance, no contactor deformation is developed as a consequence of wire configuration. In another situation, if the contactor is truly elastic, i. e. of rubber with a conductive surface film, unit radial compliance does not necessarily result in overall deformation of the contactor.

The multiplicity of points of contact between the contactor and coil (which approaches infinity in a continuous ring-shaped contactor) may lie in a common plane transverse to the coil axis or may be twisted in a helix. In the first instance a linear output is achieved with a linear wound coil and in the second instance a repetitive functional resistance change is obtained with such a coil.

Modifications in the invention permit development of both step continuous and step discontinuous potentiometer output of linear or functional nature depending upon the structural nature of the contactor and as will become apparent.

The invention will be more clearly understood by reference to the following detailed description thereof as taken in conjunction with the accompanying drawing, in which:

Fig. 6 is a partial sectional elevation of another embodiment of the invention showing an alternative arrangement of coil and contact member;

Fig. 7 is a longitudinal sectional elevation of a variant form of contact member;

Fig. 8 is a partial longitudinal sectional elevation of a different form of contact member wherein the points of contact are arranged as a helix;

Fig. 9 is a longitudinal sectional elevation of another contact member embodiment;

Fig. 10 is a longitudinal sectional elevation of a different form of contactor;

Fig. 11 is a longitudinal sectional elevation of a different form of contactor;

Fig. 12 is a longitudinal sectional elevation of a form of contact member in itself embodying a wire coil;

Fig. 13 is a transverse sectional elevation taken on the line 13—13 of Fig. 12;

Fig. 14 is a longitudinal sectional elevation of a different form of contact member also embodying wire coil construction;

Fig. 15 is a partial transverse sectional elevation taken on the line 15—15 of Fig. 14;

Fig. 16 is a transverse sectional elevation of a form of contact member employing a coil spring to radially load the contact surface;

Fig. 17 is a partial transverse sectional elevation taken on the line 17—17 of Fig. 16;

Fig. 18 is a transverse sectional elevation of a different form of spring-loaded contact member;

Fig. 19 is a longitudinal sectional elevation of a form of contact member employing a resilient loading material in its construction;

Fig. 20 is a diagram similar to the diagram of Fig. 4 showing schematically the effective relationship of a discontinuous cylindrical flat surface contact member with a resistance coil;

Fig. 21 is a graph showing the relationship of displacement and resistance in a potentiometer as illustrated schematically in Fig. 20;

Fig. 22 is an end elevation of a discontinuous contact member of the type which might be used in the potentiometer shown schematically in Fig. 20;

Fig. 23 is a partial transverse section taken on the line 23—23 of Fig. 22;

Fig. 24 is a schematic diagram showing the effective relationship of a coil and a discontinuous cylindrical flat surface contact member so constructed as to produce a step discontinuous function; and Fig. 25 is a graph of the relationship of resistance and displacement in a potentiometer of the type shown schematically in Fig. 24.

Figure 1:
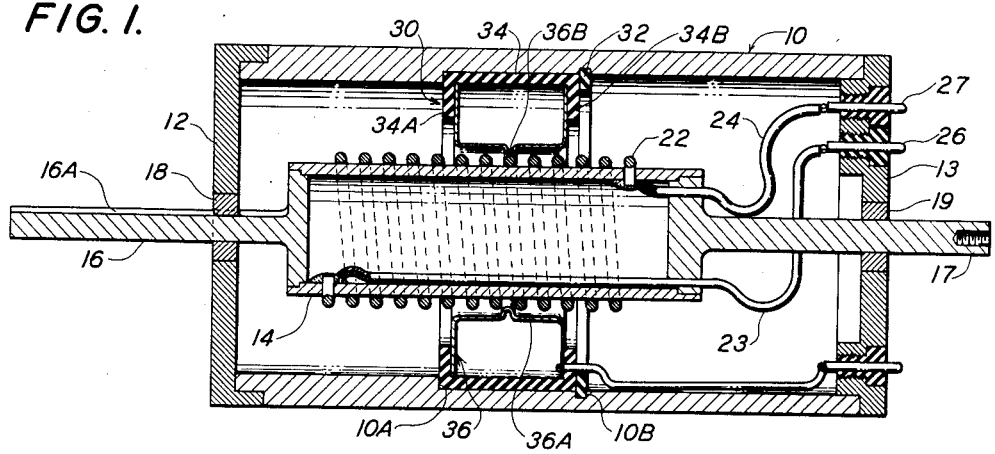
Fig. 1 is a longitudinal sectional elevation of a potentiometer in accordance with the invention.

The principles of the invention are illustrated in the potentiometer embodiment shown in longitudinal sectional elevation in Fig. 1. The potentiometer shown in this figure has a housing 10 which is conveniently cylindrical in shape and includes end members 12, 13. A mandrel 14 is supported within the housing 10 by shafts 16, 17 passing respectively through bushings 18, 19 in respective end members 12 and 13. Shaft 16 includes a keyway 16A keyed to the bushing 18 to prevent rotation of the mandrel 14 within the housing, the construction being such as to enable longitudinal displacement of the mandrel without rotation thereof. A resistance coil 22 is wound helically about the mandrel and is connected at its opposite ends through leads 23, 24 to respective terminals 26, 27 mounted through the end plate 13 of the housing.

Figure 2:
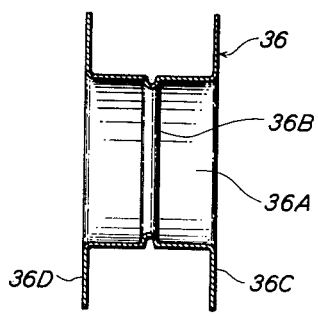
Fig. 2 is a sectional elevation of the contact member of the potentiometer of Fig. 1 as taken on the line 2—2 of Fig. 3.
Figure 3:
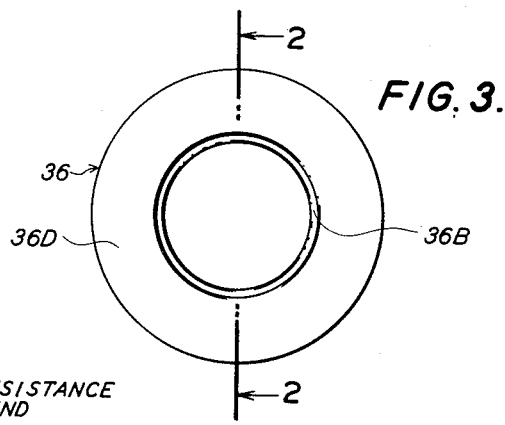
Fig. 3 is an end elevation of the contact member of the potentiometer of Fig. 1.

A contactor 30 is stationarily mounted in the housing. As illustrated, one circumferential edge of the contactor abuts against a shoulder 10A formed on the interior circumference of the housing and is held against the shoulder by an annular detent ring 32 engaged in an annular channel 10B formed interiorly of the housing. The contactor comprises a cylindrical bracket 34 having inwardly extending annular flanges 34A, 34B at opposite ends. The bracket is preferably composed of an insulating material. An electrically conductive contact ring 36 is retained in the bracket between the flanges 34A, 34B and projects inwardly therefrom. The ring 36 is shown in longitudinal sectional elevation in Fig. 2 and in end elevation in Fig. 3. The contact element has a cylindrical wall 36A provided with a continuous inwardly extending bead 36B and outwardly projecting annular flanges 36C, 36D at opposite ends which engage in the bracket 34 to fix the longitudinal position of the contact bead 36B.

As mentioned above, it is important that the actual contact surface be compliant in a radial direction to develop uniform contacting pressure with the coil, independent of normal manufacturing tolerances. If absolute accuracy in construction and size were assumed, such radial compliance of the contact area would not be necessary. However, since theoretical perfection is substantially impossible of achievement, inherent imperfection is taken into account and compensated for by this expedient.

In operation and in response to a force, pressure or acceleration in the longitudinal plane, translation of the mandrel 14 and consequently the resistance coil 22 along the longitudinal axis results. In this embodiment, a thrust exerted on either shaft 16 or 17 will affect displacement of the coil along its longitudinal axis. As a consequence of the translational motion of the coil with respect to the contact bead 36B, a change of resistance occurs that is proportional to the extent of the displacement. Resolution of this resistance change is essentially infinite because the bead 36B provides continuous contact with the coil. In each position of the coil only one point of coil-contactor engagement is significant.

Figure 4:
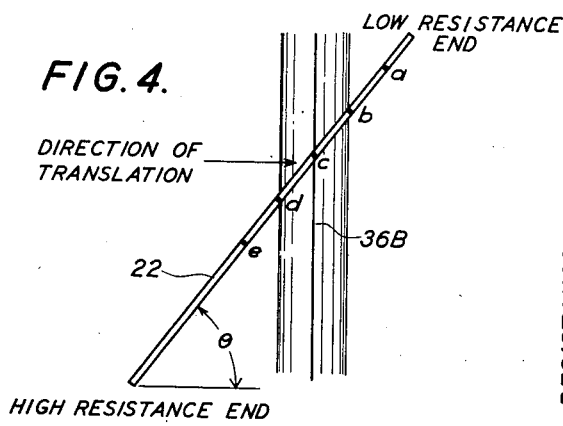
Fig. 4 is a schematic diagram illustrating the effective relationship of coil and contact member in the potentiometer of Fig. 1.
Figure 5:
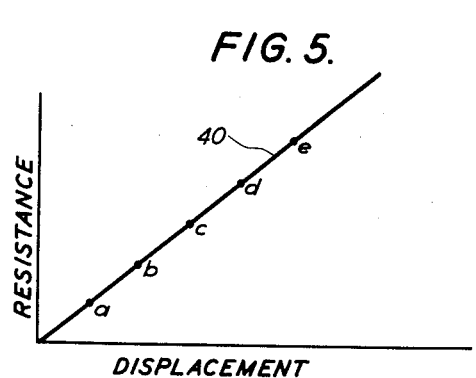
Fig. 5 is a graph in which relative displacement between the contact member and coil of the potentiometer of Fig. 1 is plotted against resistance.

The potentiometer of Fig. 1 is shown schematically in Fig. 4 in which the effective relationship of coil and contact member is portrayed by showing coil 22 as straight and inclined from the horizontal by the coil pitch angle $\theta$. The separate turns of the coil are designated by the subdivisions $a$, $b$, $c$, $d$, $e$, and the continuous line contact member 36B is shown traversing the coil. The relationship of resistance and coil displacement is illustrated graphically in Fig. 5 as developed by translation of the coil with respect to the line contact 36B. It is observed on the plot 40 of Fig. 5 that resistance change with displacement is linear and that resolution is substantially infinite. By winding the coil with a non-uniform pitch, predetermined non-linearity is achievable. By winding the resistance wire helically about a core and winding the resultant coil helically about the mandrel, a step continuous instrument of large resistance range is developed.

Fig. 6 is a partial longitudinal sectional elevation of a potentiometer differing from that of Fig. 1 in the reversal of the relationship of coil and contactor. The potentiometer of Fig. 6 includes a coil housing 46 generally of tubular shape and provided with a helically wound coil 47 supported on the inner wall thereof. As illustrated, the coil is embedded in the housing wall, a relationship which is achieved by casting a jacket, say of plastic, around a preformed coil. A contactor 50 is mounted within the housing 46 on shafts 51, 52 and includes an annular radially resilient contacting member 54 having a radially protruding circumferential bead 56 contacting the inner surfaces of the coil 47. The contact member 54 has a lead 58 leading to a terminal (not shown). The principle of operation of the apparatus of Fig. 6 is identical to that in the instrument of Fig. 1 save that relative motion between the contacting member and the coil is through translation of the contacting member. The operation of the embodiment of Fig. 6 may be considered schematically as the same as that illustrated in Figs. 4 and 5 as described with relation to Fig. 1.

Fig. 1 illustrates a potentiometer having an external contactor with respect to the coil and in which translation is accomplished by coil displacement. Fig. 6 illustrates an instrument in which the contactor is the internal member and translation is through contactor displacement. There is no necessary relationship between orientation of the coil and the contactor and displaceability. Thus either an external coil or an external contactor may be the displaceable member in addition to the converse relationship as illustrated, and situations may arise in which displaceability of both with respect to a common reference point is desirable.

Figs. 7 through 19 show various mechanical forms of contactors each designed to develop perimetral contact with the coil and to exhibit the necessary radial deformability or compliance, as discussed above.

The contacting member illustrated in longitudinal sectional elevation in Fig. 7 includes an annular bracket 60 and a contactor 62 including a cylindrical wall member 63 having opposite and outwardly extending annular flanges 64, 65 engaging in the bracket and fixing the longitudinal position of the contactor. An inwardly projecting circumferential bead 68 is formed in the wall member 63 and provides continuous essentially line contact with the coil as in the embodiment of Fig. 1. The wall member 62 is in addition corrugated circumferentially at 63A, 63B to insure the desired radial compliance of the actual contact bead 68.

The contacting member shown in partial sectional elevation in Fig. 8 includes an annular bracket 70 in which a contacting element 72 is retained between annular inwardly projecting end walls 70A, 70B. The element 72 includes a generally cylindrical wall member 73 tapering outwardly into radially extending annular flanges 74, 75 and having an inwardly projecting bead 76, formed as a generated function, by means of which the contactor engages the potentiometer coil. The helical configuration of the contacting bead of this embodiment provides means for obtaining a continuously repetitive non-linear output of infinite resolution with a linearly wound potentiometer coil.

The contact member 72 of the embodiment illustrated in Fig. 8 is domed when viewed in section, distinguishing in this respect from the flat, stiffer, inner wall member 36A of the contactor of Fig. 1.

The contact member illustrated in Fig. 9 comprises a cylindrical bracket or carrier 80 having embedded therein a semi-tubular ring-shaped contact 82. The contact 82 engages throughout a portion of its circumference in the carrier 80 extending inwardly therefrom and by virtue of the semi-tubular nature thereof presents a resilient inner circumferential coil engaging surface inwardly of the bracket.

The contact member illustrated in Fig. 10 includes a cylindrical support 84 in which an annular contact element 86 is embedded. The contact element 86 is a doubly convoluted member arranged in ring-shape engaging with and embedded in the carrier 84 at its outer circumference and providing a resilient cylindrical contact surface at its inner circumference.

The contactor shown in Fig. 11 includes a cylindrical carrier 88 and a tubular contact member 89 including an outwardly extending annular flange 90 embedded in the carrier 88. An inwardly projecting circumferential bead 92 is formed in the tubular contacting member 89 to provide the actual contact surface with the potentiometer coil.

The contactor shown in longitudinal and transverse sectional elevations respectively in Figs. 12 and 13 comprises a cylindrical bracket 94 having opposite inwardly extending annular end walls 94A, 94B. A close-wound helix 96 of square sectioned wire is shaped into a continuous torus by joining the ends and is mounted within the bracket, extending inwardly therefrom. To insure lateral stability the bracket preferably encompasses at least a diameter of the cross section of the contactor. Concentricity of line contact with the potentiometer coil is assured by the fixed support furnished by the bracket 94 whereby the toroidal shaped helix 96 is restrained in the longitudinal axis and is flexible in the transverse plane. The abutment of the inner portions of each turn of the helix provides substantially a smooth ring contacting surface.

The contactor illustrated in longitudinal and transverse sectional elevations respectively in Figs. 14 and 15 differs from that illustrated in Figs. 12 and 13 in the use of a close-wound helix of round wire. The contactor comprises a cylindrical bracket 100 having opposite inwardly extending annular end walls 100A, 100B. A wire helix 102 shaped into a continuous toroid by (selectively) joining the ends of the helix as at 102A in Fig. 15 is supported in the bracket projecting inwardly therefrom. To assure substantial continuity of contact, the inner extremity of each turn of the helix is flattened as by grinding to half the wire diameter, for example as illustrated at 102B in Fig. 15. In effect, the inner circumference of the toroidal-shaped helix is ground or otherwise removed to the point of tangency of the adjoining turns of the helix.

The contactor shown in transverse and partial longitudinal sectional elevation respectively in Figs. 16 and 17 is characterized by radial spring loading. This contactor comprises a cylindrical bracket 106 having converging inwardly extending annular end walls defining an annular channel 107 which is frusto-conical as viewed in longitudinal section. A plurality of wedge-shaped semi-cylindrical segments 108, 109, etc. are arranged to form a cylindrical contactor, each segment being housed in the annular channel 107 of the bracket and being radially spring loaded by springs 110 inwardly of the bracket. The segments are locked together by intervening cylindrical pins or hinges, the segments 108 and 109, for example, being joined by pin 112 as shown in Fig. 17.

The contactor shown in Fig. 18 differs from that shown in Fig. 16 only in the provisions of an elongated coil loading spring 116 circumscribing several contacting segments 118, 119, etc. and residing in a continuous annular groove 120 formed by circumferentially aligned grooves in each of the contacting segments 118, 119, etc.

Resilient materials may be employed for developing the necessary radial elasticity, deformability or compliance of the contact element. One such use of resilient materials is illustrated in the contacting member shown in longitudinal sectional elevation in Fig. 19. This member comprises a cylindrical carrier 124 having a rubber ring 126 bonded or otherwise affixed to its inside circumference and extending radially inwardly therefrom, the ring being frusto-conical as viewed in longitudinal section in Fig. 19. A conductive contact ring 128 is bonded or otherwise affixed to the inner circumference of the rubber ring 126. The ring 126 may be composed of any resilient material such as natural or synthetic rubber, certain plastics and the like.

The invention is adapted for use as a finite resolution potentiometer with a so-called step continuous characteristic. To accomplish this objective the contacting member is designed to present a regularly discontinuous cylindrical conducting path in the transverse plane of the potentiometer coil and concentric with the longitudinal axis thereof. The nature of the step continuous function developed by such potentiometer is determined by the coil pitch angle and the dimensions and spacing of discontinuities in the cylindrical conducting contact surface.

A potentiometer of this nature is illustrated schematically in Fig. 20 wherein the resistance coil is displayed as an inclined member 130 with a pitch angle θ and the contactor is illustrated as spaced contacting surfaces 132 and 134. The nature of the function produced by this potentiometer is, as mentioned above, a function of the pitch angle θ together with the dimensions X, Y and Z as illustrated in the figure, i. e. the area of the individual contact surfaces 132, 134, etc. and the spacing Z between these surfaces. As a contactor of the type illustrated is swept along the resistance coil, a function as illustrated in Fig. 21, in which resistance is plotted against displacement, is produced.

With reference to Fig. 20 and the generation of the function illustrated in Fig. 21, it is noted that although all of the wire encompassed between points A and B of the coil 130 is in contact with the surface of the contacting segment 132, the ohmic value reported is essentially that at point A. As the coil sweeps by the contactor, for example in the manner illustrated in Fig. 1, the resistance increase is gradually to that at point B, as illustrated by the line connecting the corresponding points A and B of the graph of Fig. 21. As the point B passes the contact area 132 the resistance peaks up immediately to value G as representing the point on the coil which has, in the interim, engaged the contact element 134. As shown in Fig. 21, the resistance will stay at the value G until the point G on the coil sweeps past the contact element 134 and then will begin to increase from G to H, and so on.

By reducing the spacing Z between individual segments of the contactor, the resistance jump, as B sweeps past the segment 132, is kept small. If the width X of the individual segments is reduced in size the dwell period G—G as shown on the graph of Fig. 21 is minimized.

A contact member of the type shown schematically in Fig. 20 is illustrated in transverse sectional elevation in Fig. 22 and partial longitudinal section in Fig. 23, the latter figure being taken on the line 23—23 of Fig. 22. This contactor includes a cylindrical bracket 140 having radial inwardly projecting end flanges 141, 142. A flanged generally cylindrical contact member 144 is supported in the bracket 140 as in previously described embodiments, the contact member 144 having a plurality of spaced inwardly projecting segments 146, 147 giving the contact member the appearance in elevation (Fig. 22) of a sprocket with the projections 146, 147, etc., furnishing the discontinuous cylindrical contact referred to above.

It is also possible to utilize the principles of the invention in a finite resolution potentiometer with a step discontinuous character by developing the contacting member as a regularly discontinuous cylindrical conducting path in the transverse plane of the potentiometer coil and concentric with the longitudinal axis thereof. The discontinuous character of the step function developed by the potentiometer is determined by the relationship of the discontinuities in the cylindrical conducting contactor and the pitch of the potentiometer coil. Such a potentiometer is illustrated schematically in Fig. 24, which figure is substantially similar to the schematic diagram of Fig. 20 above discussed.

In Fig. 24 a potentiometer coil is illustrated as the inclined member 150, the coil having a pitch θ and a discontinuous cylindrical contactor is illustrated as the separate contact segments 152, 154. The contactor differs from the corresponding contactor illustrated schematically in Fig. 20 principally in the extent of discontinuity, that is, in the spacing Z between the separate contacting segments 152, 154.

The relationship of relative coil and contactor displacement and resistance of a potentiometer as illustrated in Fig. 24 is shown graphically in Fig. 25 wherein resistance is plotted against coil displacement. As the coil 150 is translated toward the right in Fig. 24, the resistance gradually increases from the value A to the value G. Continued translation of the coil to displace the point G of the coil with respect to the contact element 152 develops essentially an open circuit between the points A and C and B and C. The circuit does not close until the point D of the coil engages the point E of the next adjacent contact segment 154. The resistance then dwells at the value D as illustrated in Fig. 25 until the point D of the coil translates beyond the point F of the contact member 154. Thereafter the resistance value increases gradually from the value D to the value H, and so on.

By increasing the pitch angle θ, the dwell D—D as illustrated in Fig. 25 remains the same but the slopes A—G and D—H become steeper. By varying the dimension X of the contactors the dwell D—D is varied correspondingly.

From the foregoing description of the potentiometer of the invention its various unique features are readily understandable. These may be briefly summarized as follows:

1. Greater accuracy by virtue of the full sweep characteristic. Presently available potentiometers are limited in their accuracy by the inherency of steps in resistance caused by sweeping individual turns of wire rather than a continuous length of wire as in the present instance. A linearity error exists by virtue of the resolution of conventional potentiometers, resolution being defined as the reciprocal of the number of active turns in swept resistance. All such error is automatically avoided in the present invention.

2. Decreased high velocity noise, again by virtue of the full sweep characteristic of the potentiometer. A conventional potentiometer generates vibrational noise and noise due to imperfect contact, particularly at high velocity sweep. Vibrational noise is caused by the contact jumping away from the winding as a consequence of brush sweeping speed and also of external vibrations. Under circumstances of continuous contact as inherent in the described instrument, jumping is automatically avoided and by virtue of the radial compliance of the contact member, external vibrations are of no significance. An increase in sweeping speed has, in this case, no adverse consequences.

3. Increased life of the potentiometers by virtue of the use of larger diameter resistance wire and helical turn construction. Presently available potentiometers of high accuracy are usually constructed with small diameter resistance wire, as for example .001 inch to keep the combination of a high degree of resolution and length of winding within practical limits. By virtue of the continuous sweep available in the potentiometer of the present invention the same sensitivity is achieved with considerably larger wire tending toward a more rugged construction.

4. Greater versatility in the lower resistance ranges by virtue of small displacement coupled with infinite resolution. This feature is of particular importance when the potentiometer is used as a displacement transducer because it permits direct coupling to bellows, diaphragms and Bourdon tube spring systems, and to spring mass systems.

5. End points can be accurately established. In the usual "card-wound" resistor form of potentiometer it is virtually impossible to terminate the resistance wire at the point of brush contact without causing loss of accuracy and linearity or without sacrificing the tolerance on the total resistance. Generally a major portion of one turn cannot be swept at either end of the resistance card. In other words, the resistance sweep cannot equal the total resistance between the coil terminals. This problem is not a limitation in the present instance because of the continuous sweep character of contact.

6. By control of wire pitch a non-linear function can be generated without sacrifice of resolution, that is, if the resistance coil is wound with regions of differing pitch a non-linear output of infinite resolution is achieved.

The invention has been illustrated and described in the form of a potentiometer, i. e. a three-terminal adjustable resistor. The same features may be embodied in a two-terminal adjustable resistor or rheostat and in fact any of the illustrated three-terminal devices may be utilized as a two-terminal instrument. The term "adjustable resistor," as used in the claims, is intended to include both of these embodiments.

It is entirely practical to utilize the described potentiometer in ganged arrangement in the same manner as presently conventional potentiometers. Additionally, appropriate exterior mechanical linkages may be employed so that the instrument will respond to angular as well as or in the stead of linear displacements. In general, the adjustable resistor of the invention is not limited in its flexibility and applications, and will exhibit the improved performance as described in any use.

I claim:

1. An adjustable resistor comprising a resistance element having a plurality of spaced turns disposed in helical configuration, an annular contactor disposed concentrically with respect to the helical element and having an electrical contact portion shaped in the form of an annular line extending continuously around the annulus at a constant radius, means for providing relative straight line movement between the contactor and the helical resistance element along the axis of the resistance element, so that the electrical contact portion of the contactor provides constant and continuous contact with the helical turns of the resistance element to produce resistance changes of high resolution with low transient noise, and means for coupling the annular contactor and the resistance element to an external circuit.

2. An adjustable resistor comprising a resistance element having a plurality of spaced turns disposed in helical configuration, a contactor of generally cylindrical shape disposed concentrically with respect to the helical element and having a bead extending all the way around the cylindrical contactor forming an electrical contact along a line of annular shape, and means for providing relative straight line movement between the contactor and the helical resistance element along the axis of the helical resistance element, so that the electrical contact portion of the contactor provides constant and continuous contact with the helical turns of the resistance element to produce resistance changes of high resolution with low transient noise, and means for coupling the contactor and the resistance element to an external circuit.

3. An adjustable resistor comprising a resistance element having a plurality of spaced turns disposed in helical configuration, a cylindrical member disposed concentrically with respect to the helical element and having a bead extending continuously around the cylindrical member forming a peripheral electrical contact portion along a line of annular shape, the cylindrical member being compliant along a plane perpendicular with respect to its axis, and means for providing relative straight line movement between the contactor and the helical resistance element along the axis of the helical resistance element, so that the electrical contact portion of the contactor provides constant and continuous contact with the helical turns of the resistance element to produce resistance changes of high resolution with low transient noise, and means for coupling the contactor and the resistance element to an external circuit.

References Cited in the file of this patent

UNITED STATES PATENTS

| | | |
|---|---|---|
| 1,276,384 | Lundy | Aug. 20, 1918 |
| 1,327,135 | Bliss | Jan. 6, 1920 |
| 1,433,750 | Spooner | Oct. 31, 1922 |

FOREIGN PATENTS

| | | |
|---|---|---|
| 495,673 | Canada | Sept. 1, 1953 |